Jan. 26, 1932.  C. D. SALISBURY  1,842,426

VALVE GEAR FOR INTERNAL COMBUSTION ENGINES

Filed Dec. 26, 1929

INVENTOR
Carl D. Salisbury

BY

Brockett, Hyde, Higley & Meyer
ATTORNEYS

Patented Jan. 26, 1932

1,842,426

UNITED STATES PATENT OFFICE

CARL D. SALISBURY, OF CLEVELAND, OHIO, ASSIGNOR, BY MESNE ASSIGNMENTS, TO THE WINTON ENGINE CORPORATION

VALVE GEAR FOR INTERNAL COMBUSTION ENGINES

Application filed December 26, 1929. Serial No. 416,519.

This invention relates to valve gear applicable to internal combustion engines wherein a plurality of poppet-type valves are to be actuated simultaneously.

A typical example of such a valve arrangement is found in so-called valve-in-the-head engine construction wherein the head for each cylinder has four poppet valves, one pair of the valves being actuated simultaneously to control inlet to the cylinder, and the other pair being operated together to control exhause from the cylinder; this arrangement being known as that of dual valves.

As will be appreciated by one familiar with the art the present accepted practice in valve gear, where overhead valves are employed, is to operate the same from the engine cam shaft, through the medium of push rods and rockers.

The positiveness with which a pair of dual valves are caused to be actuated simultaneously, is important; and it is desirable that both valves of the pair be actuated by a single rocker arm. But the rocker has angular motion, whereas the valves have parallel linear motion only.

An object of this invention is to provide novel means whereby equal linear motion is positively imparted to each of the valves, yet produced by angular motion of a single rocker. More specifically I accomplish this object by the insertion of a member, operative between the two valve stems and the adjacent rocker arm, and by providing that the inserted member have translatory motion only.

Figure 1:
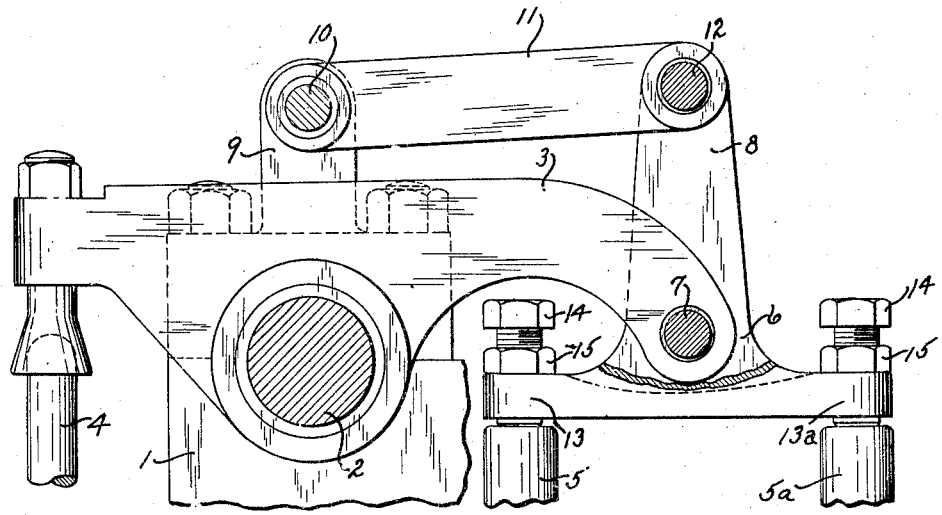
Figure 2:
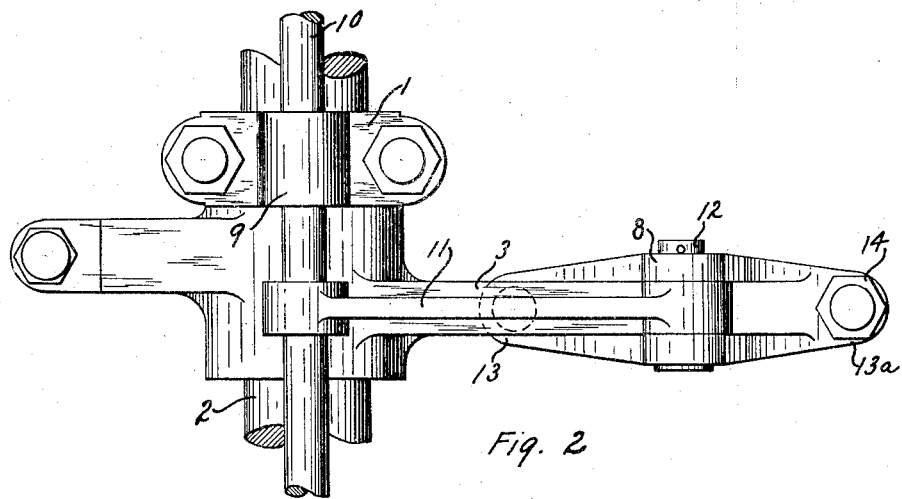

The exact nature of this invention together with further objects and advantages thereof will be apparent from the following description taken in connection with the accompanying drawings in which Fig. 1, being a typical transverse section through a multiple cylinder engine of the class described, shows substantially in elevation the pertinent parts illustrative of an application of my invention, and Fig. 2 is a plan view of the parts appearing in Fig. 1, parts being broken away in both figures to show details of construction.

With reference now to the drawings, 1 is a projection fixed on the cylinder head of the engine, the projection being thus stationary. A shaft 2 is carried by the projection 1, the shaft extending longitudinally of the engine and preferably bearing also in other projections similar to that shown. 3 is a rocker carried by the shaft 2 for free movement thereon. 4 is a cam-actuated pushrod by which rocking motion is imparted to the rocker 3 in timed relation with the other moving parts of the engine, and particularly with the piston of the corresponding cylinder thereof. 5, 5a are the parallel stem end portions of the pair of poppet valves to be operated together by the rocker 3.

What has thus far been described is old and typical in the art as will be appreciated by one familiar therewith. Also it will be apparent that while the rocker 3 has angular motion only, each of the valve stems 5 is confined for linear movement only along its axis.

According to my invention I mount upon the rocker 3 a member 6. The connection of the member 6 with the rocker 3 is accomplished by a pin 7 so that the member 6 may move relative to the rocker, about the pin 7, in the plane of rocker movement. The member 6 has an extending arm 8, and the projection 1 has an extension 9. A rod 10 is carried by the extension 9, the rod 10 being parallel above the shaft 2. The arm 8 is forked as indicated in Fig. 2, to receive a link 11 with which it has connection by the pin 12. The opposite end of the link 11 is carried by the rod 10.

The relative arrangement of the axes of the parts 2, 10, 12 and 7 is such that in a section such as indicated Fig. 1 the centers of these parts define a parallelogram. Therefore the centers of the parts 2 and 10 being fixed one above the other, the centers of the parts 7 and 12 may move each about an arc yet will always be one above the other. In other words the arm 8 and hence the member 6 will have translatory motion, that is, motion in which all of its parts follow the same direction.

At its lower extremity the member 6 is provided with a pair of feet 13, 13a oppositely extending to abutting relation with the ends of the valve stems 5, 5a, the usual adjusting bolts 14 and lock nuts 15 therefor being provided on the feet 13 for adjustment of valve stem engagement. Obviously the feet 13, 13a, being parts of the member 6, will have translatory motion therewith.

The result is that as the pushrod 4 actuates the rocker 3 both valve stems will be equally depressed regardless of inequality of effort required to depress the stems. In actuating characteristics the dual valves are therefore effectively synchronized, return or valve-seating movements of the stems under the action of the usual valve springs being controlled by the member 6 similarly as during the valve opening portion of the cycle.

It will be apparent that essentially this invention comprises the application to the art of what is known in mechanics as a parallel motion, produced in the example illustrated by a four-bar linkage.

What I claim is:

Gear for a pair of valves of the class described, and including a shaft, a bearing for said shaft having a removable cap, a rocker upon said shaft and having opposed arms, rocker-actuating means associated with one of said arms, a member pivotally mounted on the end of the other rocker arm and extending therefrom in opposite directions to provide abutments to actuate said valves together upon rocker movement, said member having an arm outstanding from said valves, and a link connecting at one end with said outstanding arm and pivotally secured at its other end with said bearing cap, whereby removal of said gear may be effected by removal of said cap.

In testimony whereof I hereby affix my signature.

CARL D. SALISBURY.